United States Patent
Millar et al.

(10) Patent No.: US 6,597,633 B1
(45) Date of Patent: Jul. 22, 2003

(54) METHOD FOR ELECTROLINETIC DOWNHOLE LOGGING

(75) Inventors: John William Aidan Millar, Wiltshire (GB); Richard Hedley Clarke, Wiltshire (GB)

(73) Assignee: Groundflow Limited, Marlborough (GB)

(*) Notice: Subject to any disclaimer, the term of this patent is extended or adjusted under 35 U.S.C. 154(b) by 0 days.

(21) Appl. No.: 09/936,862

(22) PCT Filed: Mar. 15, 2000

(86) PCT No.: PCT/GB00/00968

§ 371 (c)(1),
(2), (4) Date: Sep. 18, 2001

(87) PCT Pub. No.: WO00/55650

PCT Pub. Date: Sep. 21, 2000

(30) Foreign Application Priority Data

Mar. 18, 1999 (GB) ................................. 9906093

(51) Int. Cl.$^7$ .......................... G01V 1/36; G01V 1/40; G01V 1/20
(52) U.S. Cl. ..................... 367/35; 324/353; 73/632
(58) Field of Search ................. 367/35; 324/353, 324/323, 351; 73/155, 152, 632

(56) References Cited

U.S. PATENT DOCUMENTS

| | | | |
|---|---|---|---|
| 2,974,273 A | | 3/1961 | Vogel et al. .................... 324/1 |
| 3,599,085 A | * | 8/1971 | Semmelink .................... 324/1 |
| 3,975,674 A | | 8/1976 | McEuen ........................ 324/1 |
| 4,009,609 A | | 3/1977 | Sayer et al. .................... 73/155 |
| 4,403,146 A | | 9/1983 | Neufeld ........................ 250/262 |
| 4,427,944 A | | 1/1984 | Chandler ...................... 324/323 |
| 4,804,918 A | | 2/1989 | Vail ............................ 324/303 |
| 4,821,035 A | | 4/1989 | Hanson et al. ................ 340/856 |
| 4,904,942 A | | 2/1990 | Thompson .................... 324/323 |
| 5,192,952 A | | 3/1993 | Johler .......................... 342/22 |
| 5,214,384 A | * | 5/1993 | Sprunt et al. ................. 324/351 |
| 5,229,553 A | | 7/1993 | Lester et al. ................. 181/102 |
| 5,414,673 A | | 5/1995 | Scherbatskoy ............... 367/25 |
| RE34,975 E | | 6/1995 | Orban et al. ................... 367/34 |
| 5,519,322 A | | 5/1996 | Pozzi et al. ................... 324/346 |
| 5,689,068 A | | 11/1997 | Locatelli et al. ............. 73/152.02 |
| 5,841,280 A | | 11/1998 | Yu et al. ...................... 324/323 |
| 5,877,995 A | | 3/1999 | Thompson et al. ........... 367/14 |
| 5,903,153 A | * | 5/1999 | Clarke et al. ................. 324/323 |
| 6,225,806 B1 | | 5/2001 | Millar et al. ................. 324/353 |

FOREIGN PATENT DOCUMENTS

| | | | |
|---|---|---|---|
| EP | 0043768 A1 | 7/1981 | ............. G01V/3/26 |
| EP | 0281946 A3 | 3/1988 | ............. G01V/1/40 |
| EP | 0281946 A2 | 3/1988 | ............. G01V/1/40 |
| EP | 0512756 A1 | 4/1992 | ............. G01V/11/00 |
| GB | 2 226 886 | 12/1989 | ............. G01V/11/00 |
| WO | 1772775 A1 | 10/1992 | ............. G01V/3/08 |
| WO | WO 93/07514 | 10/1992 | ............. G01V/1/40 |
| WO | WO 94/28441 | 5/1994 | ............. G01V/3/26 |
| WO | WO 97/14980 | 10/1996 | ............. G01V/3/26 |
| WO | WO 99/05545 | 7/1998 | ............. G01V/3/26 |

OTHER PUBLICATIONS

Geophysical Applications of Electrokinetic Conversion by A. H. Thompson and G.A. Gist Exxon Production Research Company Houston, Texas.

A.V. Bukhnikashvili, GM. Prangishvili Attempts to Record the Seismoelectric Effect (Presented by academic A.I. Dzhanelidze, Mar. 17, 1956).

A Study of the Influence of Moisture on the Magnitude of the Seismoelectric Effect in Sedimentary Rocks by A Laboratory Method E.I. Parkhomenko and Chzhao Tsze–San (Chao chen–San).

* cited by examiner

Primary Examiner—Nelson Moskowitz
(74) Attorney, Agent, or Firm—Bartlett & Sherer; Ronald B. Sherer

(57) ABSTRACT

A method and apparatus for measuring the properties, such as permeability, of the rock surrounding a metal cased borehole by generating a seismic or sonic shock downhole within the borehole which is propagated into the surrounding formation where it generates an electrokinetic signal which is detected by measuring the potential between at least two space apart electrodes in contact with the casing.

14 Claims, 2 Drawing Sheets

METHOD FOR ELECTROLINETIC DOWNHOLE LOGGING

The present invention relates to a method and equipment for obtaining information concerning the rock and soil surrounding a borehole.

The measurement of permeability of rocks surrounding a borehole is important in assessing the location of water or oil reserves, including the quality and quantity of the reservoir rock. Existing methods are unable to measure the permeability of a porous rock directly with any accuracy from a downhole tool.

In addition to its value in the assessment of the quality and quantity of water or oil reservoirs, rock permeability is very important in determining at what rate and at what cost these fluids can be produced from boreholes.

Downhole logging is known in which equipment is lowered downhole, a seismic or sonic signal is generated by a seismic or sonic shock and is sent out from the borehole, this seismic signal generates an electric field and an electromagnetic signal is received and can then be analysed to obtain information concerning the rock or soil surrounding the borehole. The generation of an electric signal by this means is called an electrokinetic signal (EKS).

U.S. Pat. No. 3,599,085 describes a method in which a sonic source is lowered down a borehole and used to emit low frequency sound waves. Electrokinetic effects in the surrounding fluid-bearing rock cause an oscillating electric field in this and is measured at least two locations close to the source by contact pads touching the borehole wall. The electromagnetic skin depth is calculated from the ratio of electrical potentials and the permeability of the rock deduced. U.S. Pat. No. 4,427,944 and the equivalent European Patent 0043769 describe a method which injects fluid at high pressure from a downhole tool to generate electrokinetic potentials; these are measured by contact electrodes against the borehole wall. The risetime of the electrical response is measured and from this the permeability of the porous rock is determined.

Patent Application PCT/GB96/02542 discloses a method of measuring the properties of rock surrounding a borehole in which a seismic pulse is generated downhole which propagates outwards from the borehole to produce electrokinetic signals which are detected within the borehole and used to measure the properties of the surrounding rock.

In these methods the borehole is not cased i.e. there is no metal casing surrounding the borehole, the seismic or sonic signal is propagated directly into the surrounding formation and the electrokinetic signal generated is received from the formation. If the borehole were cased the metal casing would prevent the reception of electromagnetic signals within the borehole as the casing would act as an electromagnetic shield or cage; this means that these methods can only be used before the well is cased.

In use, operational wells are cased and so the prior art methods cannot be used for downhole logging in operational wells and this is a limitation on the application of EKS downhole logging. It EKS downhole logging could be used in cased wells this would greatly expand the application of such methods and would enable there to be regular monitoring of the rock structure surrounding a hole or a number of holes whilst in production. Such information can be generated as required, with minimal interference of drilling operations and can facilitate the selection of the location of step out wells in a structure and detect discontinuities and other information concerning the rock formation. In addition, after a production well is no longer in production, EKS downhole logging could be used to monitor the surrounding rock and to generate further knowledge about the structure and its features without requiring the drilling of extra holes.

We have surprisingly found that it is possible to produce and detect electrokinetic signals returned from the surrounding rock formation from the metal casing in a cased well.

When a well is cased and surrounded by a metal casing, usually made of steel, the returned electromagnetic signals, which are weak would be expected to be shorted out by the casing and so no signal would be received between electrodes in contact with the casing inside the borehole.

We have surprisingly found that it is possible to detect such signals and we have now devised a method for EKS logging in a cased well.

According to the invention there is provided a method for measuring the properties of an earth formation traversed by a borehole which is cased by a metallic casing in which a seismic or sonic shock is generated downhole within the borehole and is propagated into the surrounding formation and an electrokinetic signal generated by the seismic or sonic shock is detected by at least two spaced apart electrodes in contact with the casing.

The invention also comprises apparatus for detecting electrokinetic signals generated by a seismic or sonic shock generated downhole in a borehole in which apparatus there are at least two spaced apart electrodes adapted to make contact with the well casing in the cased borehole and a means connected to the electrodes which is able, in conjunction with the electrodes, to detect the electrokinetic signals.

It has been surprisingly found that, by contacting the casing with at least two spaced apart conductors, an electrical signal can be detected which has been generated by the seismic shock. Although the casing acts as a low-value resistor in parallel with the conductors it has been found, in practice, that not all the signal is shorted out.

The electrodes which are in contact with the casing are spaced apart so that the signal is generated between them and fed to the amplifier. The conductors can be in the form of a dipole and suitable separation of the conductors is from 0.05 m to 2 m.

The conductors preferably make good contact with the casing and can be in the form of spring loaded brushes as in conventional contacts, or rolling wheels which can cut through debris to make contact. Conductors can make contact in a localised area or can be in the form of a ring which fits inside the borehole and makes contact along its circumference.

Alternatively a plurality of pairs of electrodes can be positioned circumferentially around the borehole.

In one embodiment of the invention the electrical receiver preferably consists of at least one pair of electrodes forming a short dipole antenna with electrically isolated ends. For each pair the ends are connected to an amplifier which amplifies the signals whilst keeping them electrically isolated; this is carried out by referring the potential of each end independently to a floating reference potential. The signals are preferably amplified and converted to digital form before being communicated (e.g. by wire) to the surface for recording and processing.

The amplifier chosen is one which can be used with very low impedance sources. For the preferred results the amplifier can deliver an amplified signal at the frequency of the received signal, and the amplifier preferably has sufficient open loop gain at this frequency to give a detectable and measurable signal. The frequency is preferably in the range 1 Hz to 100 KHz and a gain of at least 25 decibels is preferred.

An amplifier which can be used which includes operational amplifiers of the OP37 type which can deliver a signal from a 0.1 ohm signal which can be used in the present invention. Use of and the AD849 type is also possible.

The means for generating the seismic signals preferably generates a series of pressure pulses or, more preferably, a continuous pressure oscillation, at one or more finite frequencies. It may consist of a mechanical vibrational device, an electromagnetic device, a sparker source, an explosive source, an airgun operated hydraulically or electrically or any other such conventional sonic source designed for use on a downhole tool but preferably it should be a magnetostrictive or piezoelectric transducer whose signal is controllable electrically. The term "seismic pulse" can include a pulse which can be referred to as a sonic or acoustic pulse.

A preferred means for enabling the seismic signal to be generated radially comprises a cylindrical chamber having holes in its side, which when downhole will be fall of drilling fluid with the sides of the chamber being close to the sides of the borehole, there being a means to transmit a shock or applied force to the fluid in the chamber so as to cause the shock to be transmitted through the fluid in the chamber through the holes into the surrounding rock. The holes should be distributed substantially uniformly around the casing so that the shock is transmitted in all directions. The shock or force can be applied by any of the means referred to above.

It has been found that a seismic or sonic shock can propagate through fluid in the borehole and through the casing into the traversed formation to generate electrokinetic signals.

The seismic signal can be generated whilst the apparatus is lowered or raised up from the borehole, thus providing a continuous or semi-continuous measurement of rock along the borehole.

When there is a means lowered into the borehole to generate a seismic or sonic shock pairs of electrodes can be positioned above and below the means for generating the seismic or sonic shock.

In one embodiment, in which the borehole is cased as the borehole is drilled, the sonic shock can be generated by a drill bit drilling the borehole and the detection of the electrokinetic signals by the method of the invention can be carried out whilst the borehole is drilled.

In the equipment of the present invention it is convenient to use one or two electrical receivers placed above and below the acoustic source, the case of the dipole antennae preferably aligned vertically or horizontally above and below the seismic source.

Preferably the means for detecting the electrical signals compares the potential at the ends of the electrodes. The potential at the ends of dipole antenna are compared by connecting them to an amplifier in which the potentials are preferably referred to a non-earthed reference (a virtual earth) and these new potentials are amplified and compared. Such a procedure allows amplification with very little distortion of the potential to be measured and with a high degree of common-mode noise rejection and is superior to other conventional methods of amplification. Preferably the non-earthed reference potential is that of a common line in the amplification and data acquisition circuitry of the receiver and is not connected directly to earth.

Preferably there is provision for isolating and balancing the signals from each of the electrodes before they reach the amplifier circuit in order to giver the maximum common-mode rejection of electromagnetic noise. This balancing can be achieved manually before running in a given borehole to compensate for variations in electrode performance in a given hole or by means of a suitable electronic circuit giving continuous feedback whereby continual adjustment can be made.

The seismic source preferably continuously emits sound simultaneously on at least two finite frequencies with the resultant oscillation the sum of the various sinusoidal pressure oscillations. Preferably if two frequencies are used these frequencies are between 1 Hz and 100 KHz e.g. about 1 KHz and 5 KHz.

Preferably the amplified electrical signals are demodulated with respect to the source frequencies and the amplitude and phase relative to the source sampled at a frequency of about 1–100 Hz per channel and converted from analogue to digital form, of 16 bit accuracy or more. The digital data transmitted to surface is recorded as a data file and can then be processed.

The amplitude and response of the electrokinetic response to an acoustic pulse have been shown to be closely related to the electrokinetic coefficient and the permeability of the target porous rock respectively. For a sonic oscillation of a known frequency the amplitude and phase of the electrical response with response to the source is a function of both electrokinetic coefficient and permeability; however, measurement of amplitude of response on two frequencies allows each of these properties of the rock to be determined independently. After processing a log of rock permeability, electrokinetic coefficient, electrical conductivity and porosity van be produced. Alternatively, if the amplitude and phase of the electrokinetic response at a single frequency are measured are measured, the permeability and porosity may be derived from these.

It is believed that the method of the present invention makes use of an electrokinetic effect in which the seismic wave generated by the seismic source and, passing through the interface of the borehole casing with the surrounding porous rock and through interfaces within the rock where the fluid properties change, stimulates electrical signals detected at the receiving electrodes or coils. The seismic oscillations within the porous rock give rise to fluid flow within the rock and as cations and anions adhere with differing strengths to capillary walls, a resulting electric dipole is generated within the rock. This electric dipole distorts the quasi-static electric field within the slightly conducting medium of the rock and this distortion propagates back to the tool, where it is measured.

The invention is described with reference to the accompanying drawings in which.

Figure 1:
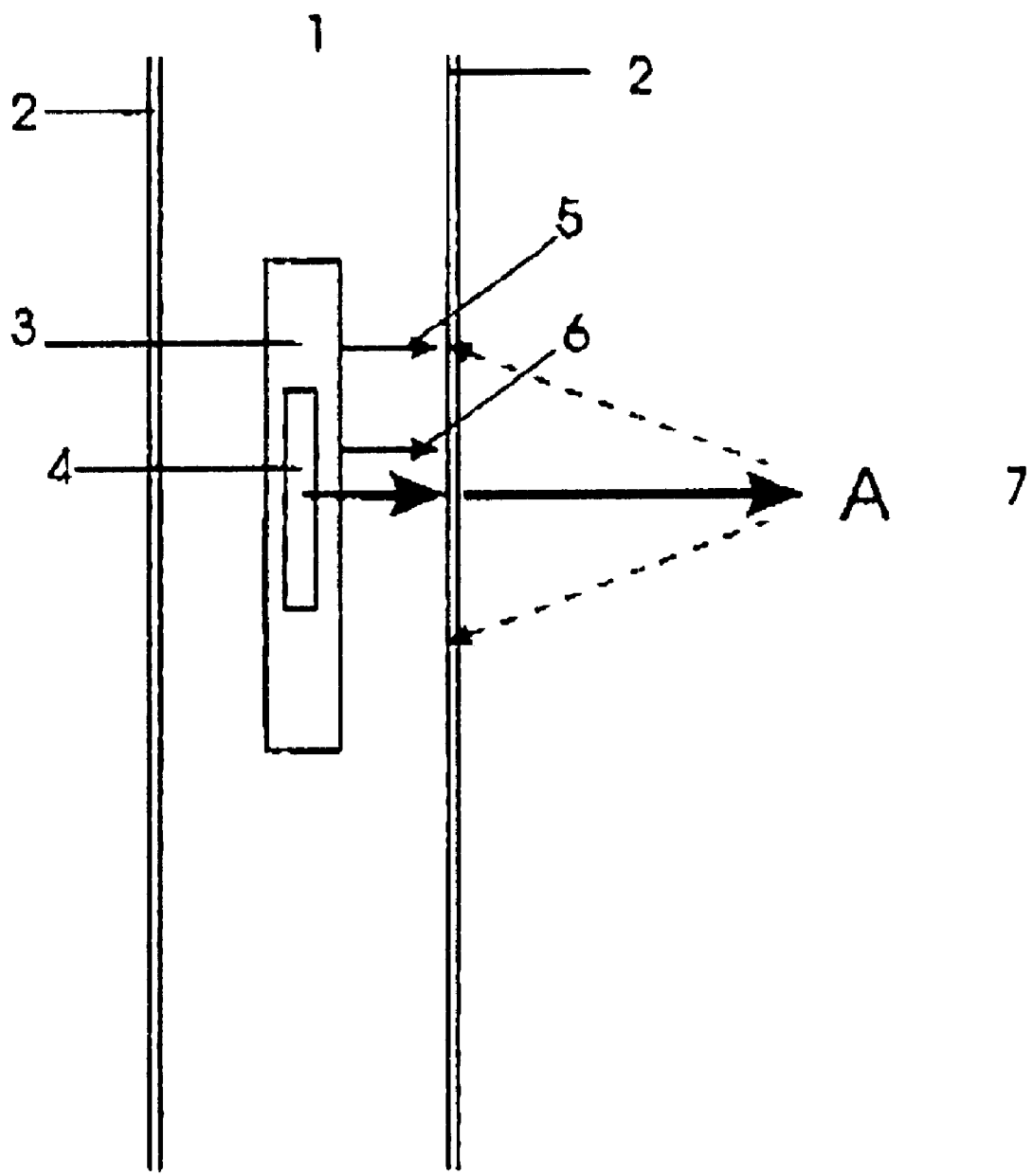
FIG. 1 illustrates the invention diagrammatically.

Referring to FIG. 1 there is a borehole (1) cased by a steel casing (2) and filled with liquid (mud etc. in the case of a well being drilled or produced liquid on the case of a production well). The downhole tool (4) is connected to a cable (5) so that it can be raised and lowered down borehole (1). In the tool are two electrodes (5) and (6) in contact with the casing. There is a seismic source (4) which consists of a hammer and piston and a cylindrical chamber with holes disposed uniformly about it.

In use, the tool (4) is lowered down the borehole (1) until it is in position. The hammer and piston are activated to produce a seismic signal comprising continuous acoustic oscillations by compression of the fluid which fills the borehole and the seismic signal propagates through the fluid and the casing into the surrounding formation (7).

The seismic signal generated is shown by the solid arrows and generates an electrokinetic signal at A, this electrokinetic signal is detected by the electrodes (5) and (6) and the amplitude and response time of the signal measured using an amplifier and passed to converter which converts then from analogue to digital form. These signals are then passed via data connectors to a computer which controls, samples and records the data and finally processes and displays them.

Figure 2:
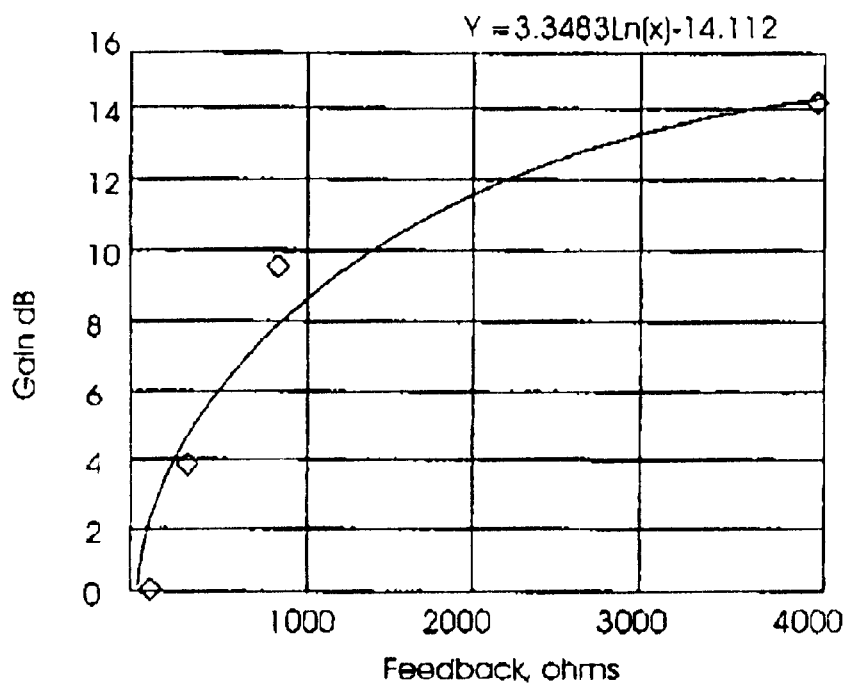
FIGS. 2 and 3 show the characteristics of amplifiers suitable for use in the invention.
Figure 3:
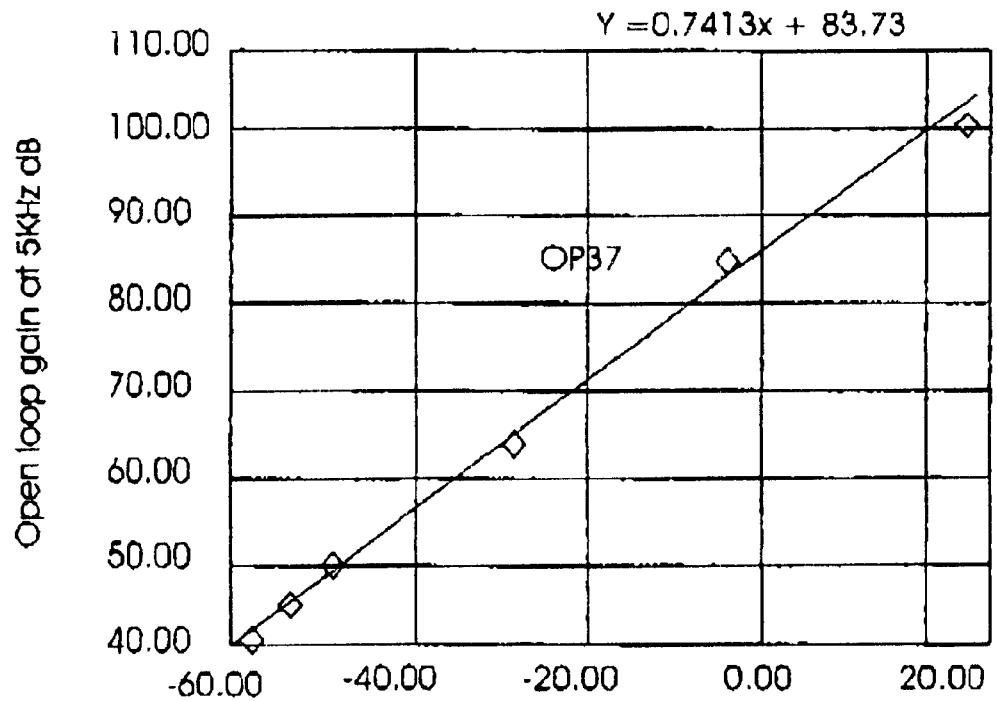

Referring to FIGS. 2 and 3, FIG. 2 is a plot of the gain in dB against feed back resistance in ohms for an OP37 amplifier and FIG. 3 is a plot of the open loop gain at 5 KHz against the signal attenuation in dB. This shows that for high feedback resistance the amplifier can deliver significant gain from a low impedance (0.1 ohm) and so can be used to amplify the signals received through the well casing.

What is claimed is:

1. A method for measuring at least one property of an earth formation traversed by a borehole having a casing comprising:
    (a) placing at least two spaced apart electrodes in contact with said casing;
    (b) generating a sonic shock within said borehole which is propagated into the earth formation;
    (c) generating electrokinetic signals by said sonic shock; and
    (d) detecting a signal from said electrodes as a measure of at least one property of the earth formation.

2. The method of claim 1 including:
    (a) forming said electrodes as a dipole antenna; and
    (b) amplifying the signal from said electrodes.

3. The method of claim 2 in which said signal is generated with a frequency in the range of 1 Hz to 100 kHz and producing a gain of least 25 decibels by the amplifier.

4. The method of claim 1 including the step of lowering or raising said electrodes while the sonic shock is generated and while said eletrokinetic signals are received.

5. The method of claim 1 including the step of drilling said borehole to produce said sonic shock and detecting said electrokinetic signals while said drilling continues.

6. The method of claim 1 including the step of comparing the potentials of the electrodes and referring them to a non-earthed reference (a virtual earth) and thereafter amplifying the resultant signals.

7. The method of claim 1 wherein said at least one property is the permeability of said earth formation.

8. Apparatus for determining at least one property of an earth formation transversed by a borehole comprising:
    (a) a casing in the borehole;
    (b) means for generating a sonic shock propagating into the formation and generating electrokinetic signals; and
    (c) at least two electrodes in electrical contact with said casing for generating an electrical signal indicative of at least one property of the formation.

9. The apparatus of claim 8 wherein said casing is metallic.

10. Apparatus as claimed in claim 8 in which the ends of the electrodes are connected to an amplifier in which the potentials are referred to a non-earthed reference (a virtual earth) and these new potentials are amplified and compared.

11. Apparatus as claimed in claim 8 including means for isolating and balancing the signals from each of the electrodes before they reach the amplifier circuit.

12. Apparatus as claimed in claim 8 in which said electrodes are spring loaded brushes.

13. Apparatus as claimed in claim 8 in which said electrodes include rolling wheel means for cutting through debris to make contact with said casing.

14. Apparatus as claimed in claim 8 in which said electrodes include a ring which fits inside the borehole and makes contact along its circumference.

* * * * *